United States Patent
Wan et al.

(10) Patent No.: US 12,006,445 B2
(45) Date of Patent: Jun. 11, 2024

(54) ANTI-RUST COMPOSITION FOR METAL SURFACE AND A METHOD OF ANTI-RUST TREATMENT ON METAL SURFACE

(71) Applicant: Chemetall GmbH, Frankfurt (DE)

(72) Inventors: Sheng Xing Wan, Shanghai (CN); Hai Xia Zou, Shanghai (CN)

(73) Assignee: CHEMETALL GMBH, Frankfurt (DE)

(*) Notice: Subject to any disclaimer, the term of this patent is extended or adjusted under 35 U.S.C. 154(b) by 120 days.

(21) Appl. No.: 17/432,378

(22) PCT Filed: Feb. 17, 2020

(86) PCT No.: PCT/EP2020/054031
§ 371 (c)(1),
(2) Date: Aug. 19, 2021

(87) PCT Pub. No.: WO2020/169507
PCT Pub. Date: Aug. 27, 2020

(65) Prior Publication Data
US 2022/0169868 A1    Jun. 2, 2022

(30) Foreign Application Priority Data
Feb. 21, 2019  (WO) ............... PCT/CN2019/075749

(51) Int. Cl.
  *C09D 5/08*   (2006.01)
  *C09D 7/20*   (2018.01)
  *C09D 7/45*   (2018.01)
  *C09D 7/63*   (2018.01)
  *C09D 7/65*   (2018.01)
  *C09D 133/00* (2006.01)
  *C09D 175/04* (2006.01)

(52) U.S. Cl.
  CPC ............... *C09D 5/08* (2013.01); *C09D 7/20* (2018.01); *C09D 7/45* (2018.01); *C09D 7/63* (2018.01); *C09D 7/65* (2018.01); *C09D 133/00* (2013.01); *C09D 175/04* (2013.01)

(58) Field of Classification Search
  CPC ... C09D 5/08; C09D 7/65; C09D 7/20; C09D 7/45; C09D 7/63; C09D 133/00; C09D 175/04
  See application file for complete search history.

(56) References Cited

U.S. PATENT DOCUMENTS

| 7,651,990 B2 * | 1/2010 | Asmus ............. C11D 3/201 |
| | | 510/136 |
| 2008/0233390 A1 * | 9/2008 | Gothlich ........... C23C 22/56 |
| | | 524/561 |
| 2014/0134368 A1 | 5/2014 | Domes et al. |

FOREIGN PATENT DOCUMENTS

| CN | 109161288 A | 1/2019 | |
| WO | WO-2009093318 A1 * | 7/2009 | ............ B05D 7/16 |

OTHER PUBLICATIONS

English translation of WO-2009093318.*
International Search Report and Written Opinion for corresponding PCT/EP2020/054031 dated May 18, 2020, 9 Pages.

* cited by examiner

*Primary Examiner* — Robert S Walters, Jr.
(74) *Attorney, Agent, or Firm* — Armstrong Teasdale LLP

(57) ABSTRACT

Described herein is an anti-rust composition for metal surfaces including: a) 30% to 80% by weight of water-soluble or water-dispersible acrylic resin and/or urethane resin; b) 0.1% to 10% by weight of epoxysilane and/or vinylsilane; c) 0.1% to 3% by weight of silicone surfactant and/or fluorosurfactant; d) 0.1% to 10% by weight of alcohol and/or ether; and e) water, where the weight percentage of each component is based on the total weight of the aqueous composition. Also described herein is an anti-rust treatment method on a metal surface including steps of i) coating the invented anti-rust composition onto the metal surface and ii) drying the coating layer at a temperature from 60° C. to 150° C. Also described herein is an anti-rust treated coil steel obtained by the anti-rust treatment method.

16 Claims, No Drawings

ANTI-RUST COMPOSITION FOR METAL SURFACE AND A METHOD OF ANTI-RUST TREATMENT ON METAL SURFACE

CROSS-REFERENCE TO RELATED APPLICATIONS

This application is a U.S. National Phase Application of International Patent Application No. PCT/EP2020/054031, filed Feb. 17, 2020, which claims priority to International Patent Application No. PCT/CN2019/075749, filed Feb. 21, 2019, the entire contents of which are hereby incorporated by reference herein.

TECHNICAL FIELD

The present invention relates to an anti-rust composition for metal surfaces and a method of anti-rust treatment on metal surfaces. More specifically, the present invention relates to an anti-rust composition for cold roll steel and a method of anti-rust treatment on cold roll steel.

BACKGROUND

Many metal coils, sheets and parts tend to get rusting without any treatment during storage and transportation. The resultant rust will bring defects that could not be overcome by further processing. Therefore, those metal coils, sheets and parts need to be prevented from rusting before delivered to the production workshop by applying an anti-rust coating layer.

Take coil steels for instance, normally the coil steels are coated with oil to block air and water during storage and transportation. However, using oil as anti-rust coating layer is followed by further treatments including steps of i). decoiling the coil steels; ii). cutting the coil steels into steel plates; iii). forming the steel plates; iv). degreasing the surfaces of coil steels; v). phosphating the surfaces of coil steels; and vi). painting. Those treatments yield lots of waste water that contain chemical compounds harmful to the environment. And meanwhile those steps bring in considerable workload to the factories.

The industry still expects a new anti-rust product that provides a good performance of anti-rust during storage and transportation and at the same time reduce the following treatment steps, especially the steps of degreasing and phosphating could be avoided that bring pollutions to the environment.

SUMMARY OF THE INVENTION

In one aspect, this invention is to provide an anti-rust composition for metal surfaces comprising:
a). 30% to 80% by weight of water-soluble or water-dispersible acrylic resin and/or urethane resin;
b). 0.1% to 10% by weight of epoxysilane and/or vinylsilane;
c). 0.1% to 3% by weight of silicone surfactant and/or fluorosurfactant;
d). 0.1% to 10% by weight of alcohol and/or ether; and
e). water, and the weight percentage of each component is based on the total weight of the aqueous composition.

In another aspect, this invention is to provide an anti-rust treatment method on metal surfaces comprising steps of i). coating the invented anti-rust composition onto the metal surfaces and ii). dry the coating layer at temperature from 60° C. to 150° C.

In another aspect, this invention is to provide an anti-rust treated coil steel obtained by the invented anti-rust treatment method.

In a further aspect, this invention is to provide a surfaces treatment method comprising the invented anti-rust treatment method.

DETAILED DESCRIPTION OF THE INVENTION

Unless defined otherwise, all technical and scientific terms used herein have the meaning commonly understood by a person skilled in the art to which the invention belongs. As used herein, the following terms have the meanings ascribed to them below, unless specified otherwise.

As used herein, the articles "a" and "an" refer to one or to more than one (i.e., to at least one) of the grammatical object of the article. By way of example, "an element" means one element or more than one element.

As used herein, the articles "resin" and "resins" refer to polymer and/or co-polymer of one or more monomers and/or the derivatives of the monomers.

As used herein, the article "water-soluble" refers to completely dissolving in water and the obtained solution is transparent.

As used herein, the article "water-dispersible" refers to evenly suspending in water and the obtained solution has no precipitation detected by eyes.

As used herein, the article "degreasing" refers to removing grease or oil from a metal surface generally using hot water, steam, alkaline cleaners, or organic solvents.

As used herein, the article "phosphating" refers to the application of phosphoric acid on steel or iron parts, where a classic acid and metal reaction takes place which locally depletes the hydronium ($H_3O^+$) ions, raising the pH, and causing the dissolved salt to fall out of solution and be precipitated on the surface of steel or iron parts.

As used herein, the article "decoiling" refers to a process of spreading out coiled steels into a flat steel plate.

As used herein, the article "forming" refers to a mechanical process wherein metals undergo plastic deformations and acquire required shapes and sizes by application of suitable stresses such as compression, shear and tension.

The metal sheets, plates such as coil steels are prone to rusting especially in a humid climate. During their storage and transportation, it is required to make an anti-rust coating onto the metal surfaces to avoid defects. The most often used anti-rust agent is oil that need to be removed by degreasing process and furthermore a phosphating process is required before painting. Both degreasing and phosphating process will bring in a lot of wasted water that contains harmful chemical compounds to the environment. And complicated steps also add burdens to the plants.

To solve this problem, this invention provided an anti-rust composition that ensures no rust during storage and transportation and at the same time could be painted without steps of degreasing and phosphating.

The invented anti-rust composition for metal surfaces comprising:
a). 30% to 80% by weight of water-soluble or water-dispersible acrylic resin and/or urethane resin;
b). 0.1% to 10% by weight of epoxysilane and/or vinylsilane;
c). 0.1% to 3% by weight of silicone surfactant and/or fluorosurfactant;
d). 0.1% to 10% by weight of alcohol and/or ether; and e). water, and the weight percentage of each component is based on the total weight of the aqueous composition.

Preferably, the component a) of the invented anti-rust composition is water-dispersible acrylic resin and/or urethane resin. The acrylic resin in component a) is at least one selected from the polymer of (meth)acrylic acid, alkyl (meth)acrylate, cycloalkyl (meth)acrylate, alkoxyalkyl (meth)acrylate, (meth)acrylate alkyl ester, hydroxyalkyl (meth)acrylate ester, (meth)acrylonitrile and trifuloroethyl (meth)acrylonitriline. And the urethane resin in component a) is the reaction product of isocyanates selected from methylene diphenyl diisocyanate (MDI), toluene diisocyanate (TDI), hexamethylene diisocyanate (HDI) and isophorone diisocyanate (IPDI) and polyols selected from the reaction products of carboxylic acids and polyhydroxyl compounds.

Preferably, the epoxysilane in component b) of the invented anti-rust composition is at least one selected from glycidyloxypropyltrimethoxysilane, 3-(2,3-epoxypropoxy) propyltrimethoxysilane, 3-(2,3-epoxypropoxy)propyltriethoxysilane, 3-(2,3-epoxypro-poxy)propylmethyldiethoxysilane, 2-(3,4-epoxycyclohexane)ethyltrimethoxysilane, 2-(3,4-epoxycyclohexyl)ethyltriethoxysilane, 2-(3,4-epoxycyclohexyl)ethyltrimethoxysilane, 3-(2,3-epoxypropoxy) propylmethyldimethoxysilane.

Preferably, the vinylsilane in component b) of the invented anti-rust composition is at least one selected from trimethoxyvinylsilane, triethoxyvinylsilane, diethoxymethylvinylsilane, trimethylvinylsilane, 2-pyridyldimethylvinylsilane, triacetoxyvinylsilane, triphenylvinylsilane, trichlorovinylsilane, chloromethylphenylvinylsilane, dichloromethylvinylsilane, triisopropoxyvinylsilane and trimethylstannyldimethylvinylsilane.

Preferably, the silicone surfactant in component c) of the invented anti-rust composition is at least one selected from non-ionic organopolysiloxane, cationic organopolysiloxane and anionic organopolysiloxane and more preferably at least one selected from poly[ethyleneoxide(10)-co-propyleneoxide(2)]-dimethicone, poly[ethyleneoxide(12)-co-propyleneoxide(16)]-dimethicone,
poly[ethyleneoxide(12)-co-propyleneoxide(18)]-dimethicone,
poly[ethyleneoxide(14)-co-propyleneoxide(4)]-dimethicone,
poly[ethyleneoxide(15)-co-propyleneoxide(15)]-dimethicone,
poly[ethyleneoxide(16)-co-propyleneoxide(2)]-dimethicone,
poly[ethyleneoxide(16)-co-propyleneoxide(8)]-dimethicone,
poly[ethyleneoxide(17)-co-propyleneoxide(18)]-dimethicone,
poly[ethyleneoxide(18)-co-propyleneoxide(18)]-dimethicone,
poly[ethyleneoxide(18)-co-propyleneoxide(6)]-dimethicone,
poly[ethyleneoxide(19)-co-propyleneoxide(19)]-dimethicone,
poly[ethyleneoxide(20)-co-propyleneoxide(15)]-dimethicone,
poly[ethyleneoxide(20)-co-propyleneoxide(20)]-dimethicone,
poly[ethyleneoxide(20)-co-propyleneoxide(23)]-dimethicone,
poly[ethyleneoxide(20)-co-propyleneoxide(29)]-dimethicone,
poly[ethyleneoxide(20)-co-propyleneoxide(6)]-dimethicone,
poly[ethyleneoxide(22)-co-propyleneoxide(23)]-dimethicone,
poly[ethyleneoxide(22)-co-propyleneoxide(24)]-dimethicone,
poly[ethyleneoxide(23)-co-propyleneoxide(6)]-dimethicone,
poly[ethyleneoxide(25)-co-propyleneoxide(25)]-dimethicone,
poly[ethyleneoxide(27)-co-propyleneoxide(27)]-dimethicone,
poly[ethyleneoxide(3)-co-propyleneoxide(10)]-dimethicone,
poly[ethyleneoxide(4)-co-propyleneoxide(12)]-dimethicone,
poly[ethyleneoxide(6)-co-propyleneoxide(11)]-dimethicone,
poly[ethyleneoxide(8)-co-propyleneoxide(14)]-dimethicone,
poly[ethyleneoxide(8)-co-propyleneoxide(26)]-dimethicone,
poly[ethyleneoxide(30)-co-propyleneoxide(10)]-dimethicone,
poly[dimethylsiloxane-co-methyl(3-hydroxypropyl)siloxane]-graft-poly(ethyleneoxide/propyleneoxide).

Preferably, the fluorosurfactant in component c) of the invented anti-rust composition is at least one selected from perfluorooctanesulfonic acid (PFOS), perfluorooctanoic acid (PFOA), and perfluorononanoic acid (PFNA), perfluorobutane sulfonate (PFBS) and perfluorohexanoic acid (PFHxA).

Preferably, the alcohol in component d) of the invented anti-rust composition is at least one selected from propylene glycol, butyl alcohol, isopropanol, n-butanol, ethylene glycol, propylene glycol, 1,3-butanediol, dipropylene glycol, diethylaminoethanol.

Preferably, the ether in component d) of the invented anti-rust composition is at least one selected from diethylene glycol monobutyl ether, tripropylene glycol monobutyl ether, propylene glycol methyl ether, dipropylene glycol butyl ether, dipropylene glycol methyl ether, diethylene glycol butyl ether, tripropylene glycol butyl ether, ethanol dimethyl ether, ethylene glycol phenyl ether, ethylene glycol monobutyl ether, ethylene glycol ether, dibutyl ether.

Preferably, the invented anti-rust composition further comprises at least one additive selected from defoamer, crosslinking agent, anti-corrosion agent, silicone and ammonium zirconium carbonate, zirconium acetylacetonate, zirconium acetate.

This invention also provided an anti-rust treatment method on metal surfaces comprising steps of i). coating the invented anti-rust composition onto the metal surfaces; ii). dry the coating layer at temperature from 60° C. to 150° C. Preferably, the coating layer dried after step ii) has a thickness of from 100 nm to 1000 nm. This invention also provided an anti-rust treated coil steel obtained by the invented anti-rust treatment method. Preferably, the surfaces of the treated steels have an electric resistance of less than 1 mΩ. If the thickness of the dried coating layer is substantially less than 100 nm, the anti-rust performance tends to deteriorate. However, if the thickness of the dried coating layer is substantially more than 1000 nm, the electric resistance of the coated substrates surfaces tends to increase and go beyond the acceptable scope.

Preferably, the metal surfaces are the surfaces of cold roll steel, hot dip galvanized steel and electrogalvanized steel.

This invention also provided a surface treatment method comprising the invented anti-rust treatment method. And such surface treatment method further comprises a step of painting but does not comprise steps of degreasing and phosphating.

Embodiment

The following embodiments are used to illustrate the invention in more detail.

The 1$^{st}$ embodiment is a composition comprising:
a). 30% to 80% by weight of water-dispersible acrylic resin;
b). 0.1% to 10% by weight of epoxysilane;
c). 0.1% to 3% by weight of silicone surfactant;
d). 0.1% to 10% by weight of alcohol; and
e). water, and the weight percentage of each component is based on the total weight of the aqueous composition.

The 2$^{nd}$ embodiment is a composition comprising:
a). 30% to 80% by weight of water-dispersible urethane resin;
b). 0.1% to 10% by weight of epoxysilane;
c). 0.1% to 3% by weight of silicone surfactant;
d). 0.1% to 10% by weight of alcohol; and
e). water, and the weight percentage of each component is based on the total weight of the aqueous composition.

The 3$^{rd}$ embodiment is a composition comprising:
a). 30% to 80% by weight of water-dispersible acrylic resin and urethane resin;
b). 0.1% to 10% by weight of epoxysilane;
c). 0.1% to 3% by weight of silicone surfactant;
d). 0.1% to 10% by weight of alcohol; and
e). water, and the weight percentage of each component is based on the total weight of the aqueous composition.

The 4$^{th}$ embodiment is a composition comprising:
a). 30% to 80% by weight of water-dispersible acrylic resin and urethane resin;
b). 0.1% to 10% by weight of vinylsilane;
c). 0.1% to 3% by weight of silicone surfactant;
d). 0.1% to 10% by weight of alcohol; and
e). water, and the weight percentage of each component is based on the total weight of the aqueous composition.

The 5$^{th}$ embodiment is a composition comprising:
a). 30% to 80% by weight of water-dispersible acrylic resin and urethane resin;
b). 0.1% to 10% by weight of epoxysilane;
c). 0.1% to 3% by weight of fluorosurfactant;
d). 0.1% to 10% by weight of alcohol; and
e). water, and the weight percentage of each component is based on the total weight of the aqueous composition.

The 6$^{th}$ embodiment is a composition comprising:
a). 30% to 80% by weight of water-dispersible acrylic resin and urethane resin;
b). 0.1% to 10% by weight of epoxysilane;
c). 0.1% to 3% by weight of fluorosurfactant;
d). 0.1% to 10% by weight of ether; and
e). water, and the weight percentage of each component is based on the total weight of the aqueous composition.

The 7$^{th}$ embodiment is a composition comprising:
a). 30% to 80% by weight of water-dispersible acrylic resin;
b). 0.1% to 10% by weight of vinylsilane;
c). 0.1% to 3% by weight of silicone surfactant;
d). 0.1% to 10% by weight of alcohol; and
e). water, and the weight percentage of each component is based on the total weight of the aqueous composition.

The 8$^{th}$ embodiment is a composition comprising:
a). 30% to 80% by weight of water-dispersible acrylic resin;
b). 0.1% to 10% by weight of vinylsilane;
c). 0.1% to 3% by weight of silicone surfactant;
d). 0.1% to 10% by weight of ether; and
e). water, and the weight percentage of each component is based on the total weight of the aqueous composition.

The 9$^{th}$ embodiment is a composition comprising:
a). 30% to 80% by weight of water-dispersible urethane resin;
b). 0.1% to 10% by weight of vinylsilane;
c). 0.1% to 3% by weight of silicone surfactant;
d). 0.1% to 10% by weight of ether; and
e). water, and the weight percentage of each component is based on the total weight of the aqueous composition.

The 10$^{th}$ embodiment is a composition comprising:
a). 30% to 80% by weight of water-dispersible acrylic resin and urethane resin;
b). 0.1% to 10% by weight of epoxysilane and vinylsilane;
c). 0.1% to 3% by weight of silicone surfactant and fluorosurfactant;
d). 0.1% to 10% by weight of alcohol and ether; and
e). water, and the weight percentage of each component is based on the total weight of the aqueous composition.

The 11$^{th}$ embodiment is a composition comprising:
a). 30% to 80% by weight of water-dispersible acrylic resin and urethane resin;
b). 0.1% to 10% by weight of epoxysilane and vinylsilane;
c). 0.1% to 3% by weight of silicone surfactant;
d). 0.1% to 10% by weight of alcohol and ether; and
e). water, and the weight percentage of each component is based on the total weight of the aqueous composition.

The 12$^{th}$ embodiment is a composition comprising:
a). 30% to 80% by weight of at least one acrylic resin selected from the polymer of (meth)acrylic acid, alkyl (meth)acrylate, cycloalkyl (meth)acrylate, alkoxyalkyl (meth)acrylate, (meth)acrylate alkyl ester, hydroxyalkyl (meth)acrylate ester, (meth)acrylonitrile and trifuloroethyl (meth)acrylonitriline;
b). 0.1% to 10% by weight of at least one epoxysilane selected from glycidyloxypropyltrimethoxysilane, 3-(2,3 epoxypropoxy)propyltrimethoxysilane, 3-(2,3 epoxypropoxy)propyltriethoxysilane, 3-(2,3 epoxypropoxy)propyl Me-thyldiethoxysilane, 2-(3,4-epoxycyclohexane)ethyltrimethoxysilane, 2-(3,4-epoxycyclohexyl)ethyltriethoxysilane, 2-(3,4-epoxycyclohexyl)ethyltrimethoxysilane, 3-(2.3-epoxypropoxy)propylmethyldimethoxysilane;
c). 0.1% to 3% by weight of at least one silicone surfactant selected from
poly[ethyleneoxide(10)-co-propyleneoxide(2)]-dimethicone,
poly[ethyleneoxide(12)-co-propyleneoxide(16)]-dimethicone,
poly[ethyleneoxide(12)-co-propyleneoxide(18)]-dimethicone,
poly[ethyleneoxide(14)-co-propyleneoxide(4)]-dimethicone,
poly[ethyleneoxide(15)-co-propyleneoxide(15)]-dimethicone,
poly[ethyleneoxide(16)-co-propyleneoxide(2)]-dimethicone,
poly[ethyleneoxide(16)-co-propyleneoxide(8)]-dimethicone, poly[ethyleneoxide(17)-co-propyleneoxide(18)]-dimethicone,
poly[ethyleneoxide(18)-co-propyleneoxide(18)]-dimethicone,
poly[ethyleneoxide(18)-co-propyleneoxide(6)]-dimethicone,
poly[ethyleneoxide(19)-co-propyleneoxide(19)]-dimethicone,
poly[ethyleneoxide(20)-co-propyleneoxide(15)]-dimethicone,
poly[ethyleneoxide(20)-co-propyleneoxide(20)]-dimethicone,
poly[ethyleneoxide(20)-co-propyleneoxide(23)]-dimethicone,
poly[ethyleneoxide(20)-co-propyleneoxide(29)]-dimethicone,
poly[ethyleneoxide(20)-co-propyleneoxide(6)]-dimethicone,
poly[ethyleneoxide(22)-co-propyleneoxide(23)]-dimethicone,
poly[ethyleneoxide(22)-co-propyleneoxide(24)]-dimethicone,
poly[ethyleneoxide(23)-co-propyleneoxide(6)]-dimethicone,
poly[ethyleneoxide(25)-co-propyleneoxide(25)]-dimethicone,
poly[ethyleneoxide(27)-co-propyleneoxide(27)]-dimethicone,
poly[ethyleneoxide(3)-co-propyleneoxide(10)]-dimethicone,
poly[ethyleneoxide(4)-co-propyleneoxide(12)]-dimethicone,
poly[ethyleneoxide(6)-co-propyleneoxide(11)]-dimethicone,
poly[ethyleneoxide(8)-co-propyleneoxide(14)]-dimethicone,
poly[ethyleneoxide(8)-co-propyleneoxide(26)]-dimethicone,
poly[ethyleneoxide(30)-co-propyleneoxide(10)]-dimethicone,
poly[dimethylsiloxane-co-methyl(3-hydroxypropyl)siloxane]-graft-poly(ethyleneoxide/propyleneoxide);
  d). 0.1% to 10% by weight of at least one alcohol selected from propylene glycol, butyl alcohol, isopropanol, n-butanol, ethylene glycol, propylene glycol, 1,3-butanediol, dipropylene glycol, diethylaminoethanol; and
  e). water, and the weight percentage of each component is based on the total weight of the aqueous composition.
The 13$^{th}$ embodiment is a composition comprising:
  a). 30% to 80% by weight of urethane resin that is the reaction product of isocyanates selected from methylene diphenyl diisocyanate (MDI), toluene diisocyanate (TDI), hexamethylene diisocyanate (HDI) and isophorone diisocyanate (IPDI) and polyols selected from the reaction products of carboxylic acids and polyhydroxyl compounds;
  b). 0.1% to 10% by weight of at least one epoxysilane selected from glycidyloxypropyltrimethoxysilane, 3-(2,3 epoxypropoxy)propyltrimethoxysilane, 3-(2,3 epoxypropoxy)propyltriethoxysilane, 3-(2,3 epoxypropoxy)propyl Me-thyldiethoxysilane, 2-(3,4-epoxycyclohexane)ethyltrimethoxysilane, 2-(3,4-epoxycyclohexyl)ethyltriethoxysilane, 2-(3,4-epoxycyclohexyl)ethyltrimethoxysilane, 3-(2.3-epoxypropoxy)propylmethyldimethoxysilane;
  c). 0.1% to 3% by weight of at least one fluorosurfactant selected from perfluorooctanesulfonic acid (PFOS), perfluorooctanoic acid (PFOA), and perfluorononanoic acid (PFNA), perfluorobutane sulfonate (PFBS) and perfluorohexanoic acid (PFHxA);
  d). 0.1% to 10% by weight of at least one alcohol selected from propylene glycol, butyl alcohol, isopropanol, n-butanol, ethylene glycol, propylene glycol, 1,3-butanediol, dipropylene glycol, diethylaminoethanol; and
  e). water, and the weight percentage of each component is based on the total weight of the aqueous composition.
The 14$^{th}$ embodiment is a composition comprising:
  a). 30% to 80% by weight of at least one acrylic resin selected from the polymer of (meth)acrylic acid, alkyl (meth)acrylate, cycloalkyl (meth)acrylate, alkoxyalkyl (meth)acrylate, (meth)acrylate alkyl ester, hydroxyalkyl (meth)acrylate ester, (meth)acrylonitrile and trifuloroethyl (meth)acrylonitriline;
  b). 0.1% to 10% by weight of at least one epoxysilane selected from glycidyloxypropyltrimethoxysilane, 3-(2,3 epoxypropoxy)propyltrimethoxysilane, 3-(2,3 epoxypropoxy)propyltriethoxysilane, 3-(2,3 epoxypropoxy)propyl Me-thyldiethoxysilane, 2-(3,4-epoxycyclohexane)ethyltrimethoxysilane, 2-(3,4-epoxycyclohexyl)ethyltriethoxysilane, 2-(3,4-epoxycyclohexyl)ethyltrimethoxysilane, 3-(2.3-epoxypropoxy)propylmethyldimethoxysilane;
  c). 0.1% to 3% by weight of at least one fluorosurfactant selected from perfluorooctanesulfonic acid (PFOS), perfluorooctanoic acid (PFOA), and perfluorononanoic acid (PFNA), perfluorobutane sulfonate (PFBS) and perfluorohexanoic acid (PFHxA);
  d). 0.1% to 10% by weight of at least one alcohol selected from propylene glycol, butyl alcohol, isopropanol, n-butanol, ethylene glycol, propylene glycol, 1,3-butanediol, dipropylene glycol, diethylaminoethanol and 0.1% to 10% by weight of at least one ether selected from diethylene glycol monobutyl ether, tripropylene glycol monobutyl ether, propylene glycol methyl ether, dipropylene glycol butyl ether, dipropylene glycol methyl ether, diethylene glycol butyl ether, tripropylene glycol butyl ether, ethanol dimethyl ether, ethylene glycol phenyl ether, ethylene glycol monobutyl ether, ethylene glycol ether, B Dibutyl ether; and
  e). water, and the weight percentage of each component is based on the total weight of the aqueous composition.
The 15$^{th}$ embodiment is a composition comprising:
  a). 30% to 80% by weight of at least one acrylic resin selected from the polymer of (meth)acrylic acid, alkyl (meth)acrylate, cycloalkyl (meth)acrylate, alkoxyalkyl (meth)acrylate, (meth)acrylate alkyl ester, hydroxyalkyl (meth)acrylate ester, (meth)acrylonitrile and trifuloroethyl (meth)acrylonitriline;
  b). 0.1% to 10% by weight of at least one vinylsilane selected from trimethoxyvinylsilane, triethoxyvinylsilane, diethoxymethylvinylsilane, trimethylvinylsilane, 2-pyridyldimethylvinylsilane, triacetoxyvinylsilane, triphenylvinylsilane, trichlorovinylsilane, chloromethylphenylvinylsilane, dichloromethylvinylsilane, triisopropoxyvinylsilane and trimethylstannyldimethylvinylsilane;
  c). 0.1% to 3% by weight of at least one silicone surfactant selected from
poly[ethyleneoxide(10)-co-propyleneoxide(2)]-dimethicone,
poly[ethyleneoxide(12)-co-propyleneoxide(16)]-dimethicone,
poly[ethyleneoxide(12)-co-propyleneoxide(18)]-dimethicone, poly[ethyleneoxide(14)-co-propyleneoxide(4)]-dimethicone,
poly[ethyleneoxide(15)-co-propyleneoxide(15)]-dimethicone,
poly[ethyleneoxide(16)-co-propyleneoxide(2)]-dimethicone,
poly[ethyleneoxide(16)-co-propyleneoxide(8)]-dimethicone,
poly[ethyleneoxide(17)-co-propyleneoxide(18)]-dimethicone,
poly[ethyleneoxide(18)-co-propyleneoxide(18)]-dimethicone,
poly[ethyleneoxide(18)-co-propyleneoxide(6)]-dimethicone,
poly[ethyleneoxide(19)-co-propyleneoxide(19)]-dimethicone,
poly[ethyleneoxide(20)-co-propyleneoxide(15)]-dimethicone,
poly[ethyleneoxide(20)-co-propyleneoxide(20)]-dimethicone,
poly[ethyleneoxide(20)-co-propyleneoxide(23)]-dimethicone,
poly[ethyleneoxide(20)-co-propyleneoxide(29)]-dimethicone,
poly[ethyleneoxide(20)-co-propyleneoxide(6)]-dimethicone,
poly[ethyleneoxide(22)-co-propyleneoxide(23)]-dimethicone,
poly[ethyleneoxide(22)-co-propyleneoxide(24)]-dimethicone,
poly[ethyleneoxide(23)-co-propyleneoxide(6)]-dimethicone,
poly[ethyleneoxide(25)-co-propyleneoxide(25)]-dimethicone,
poly[ethyleneoxide(27)-co-propyleneoxide(27)]-dimethicone,
poly[ethyleneoxide(3)-co-propyleneoxide(10)]-dimethicone,
poly[ethyleneoxide(4)-co-propyleneoxide(12)]-dimethicone,
poly[ethyleneoxide(6)-co-propyleneoxide(11)]-dimethicone,
poly[ethyleneoxide(8)-co-propyleneoxide(14)]-dimethicone,
poly[ethyleneoxide(8)-co-propyleneoxide(26)]-dimethicone,
poly[ethyleneoxide(30)-co-propyleneoxide(10)]-dimethicone,
poly[dimethylsiloxane-co-methyl(3-hydroxypropyl)siloxane]-graft-poly(ethyleneoxide/propyleneoxide);
d). 0.1% to 10% by weight of at least one ether selected from diethylene glycol monobutyl ether, tripropylene glycol monobutyl ether, propylene glycol methyl ether, dipropylene glycol butyl ether, dipropylene glycol methyl ether, diethylene glycol butyl ether, tripropylene glycol butyl ether, ethanol dimethyl ether, ethylene glycol phenyl ether, ethylene glycol monobutyl ether, ethylene glycol ether, B Dibutyl ether; and
e). water, and the weight percentage of each component is based on the total weight of the aqueous composition.

The 16$^{th}$ embodiment is a composition comprising:
a). 30% to 80% by weight of urethane resin that is the reaction product of isocyanates selected from methylene diphenyl diisocyanate (MDI), toluene diisocyanate (TDI), hexamethylene diisocyanate (HDI) and isophorone diisocyanate (IPDI) and polyols selected from the reaction products of carboxylic acids and polyhydroxyl compounds;
b). 0.1% to 10% by weight of at least one vinylsilane selected from at least one selected from trimethoxyvinylsilane, triethoxyvinylsilane, diethoxymethylvinylsilane, trimethylvinylsilane, 2-pyridyldimethylvinylsilane, triacetoxyvinylsilane, triphenylvinylsilane, trichlorovinylsilane, chloromethylphenylvinylsilane, dichloromethylvinylsilane, triisopropoxyvinylsilane and trimethylstannyldimethylvinylsilane;
c). 0.1% to 3% by weight of at least one silicone surfactant selected from
poly[ethyleneoxide(10)-co-propyleneoxide(2)]-dimethicone,
poly[ethyleneoxide(12)-co-propyleneoxide(16)]-dimethicone,
poly[ethyleneoxide(12)-co-propyleneoxide(18)]-dimethicone,
poly[ethyleneoxide(14)-co-propyleneoxide(4)]-dimethicone,
poly[ethyleneoxide(15)-co-propyleneoxide(15)]-dimethicone,
poly[ethyleneoxide(16)-co-propyleneoxide(2)]-dimethicone,
poly[ethyleneoxide(16)-co-propyleneoxide(8)]-dimethicone,
poly[ethyleneoxide(17)-co-propyleneoxide(18)]-dimethicone,
poly[ethyleneoxide(18)-co-propyleneoxide(18)]-dimethicone,
poly[ethyleneoxide(18)-co-propyleneoxide(6)]-dimethicone,
poly[ethyleneoxide(19)-co-propyleneoxide(19)]-dimethicone,
poly[ethyleneoxide(20)-co-propyleneoxide(15)]-dimethicone,
poly[ethyleneoxide(20)-co-propyleneoxide(20)]-dimethicone,
poly[ethyleneoxide(20)-co-propyleneoxide(23)]-dimethicone,
poly[ethyleneoxide(20)-co-propyleneoxide(29)]-dimethicone,
poly[ethyleneoxide(20)-co-propyleneoxide(6)]-dimethicone,
poly[ethyleneoxide(22)-co-propyleneoxide(23)]-dimethicone,
poly[ethyleneoxide(22)-co-propyleneoxide(24)]-dimethicone,
poly[ethyleneoxide(23)-co-propyleneoxide(6)]-dimethicone,
poly[ethyleneoxide(25)-co-propyleneoxide(25)]-dimethicone,
poly[ethyleneoxide(27)-co-propyleneoxide(27)]-dimethicone,
poly[ethyleneoxide(3)-co-propyleneoxide(10)]-dimethicone,
poly[ethyleneoxide(4)-co-propyleneoxide(12)]-dimethicone,
poly[ethyleneoxide(6)-co-propyleneoxide(11)]-dimethicone,
poly[ethyleneoxide(8)-co-propyleneoxide(14)]-dimethicone,
poly[ethyleneoxide(8)-co-propyleneoxide(26)]-dimethicone,
poly[ethyleneoxide(30)-co-propyleneoxide(10)]-dimethicone, poly[dimethylsiloxane-co-methyl(3-hydroxypropyl)siloxane]-graft-poly(ethyleneoxide/propyleneoxide);

d). 0.1% to 10% by weight of at least one ether selected from diethylene glycol monobutyl ether, tripropylene glycol monobutyl ether, propylene glycol methyl ether, dipropylene glycol butyl ether, dipropylene glycol methyl ether, diethylene glycol butyl ether, tripropylene glycol butyl ether, ethanol dimethyl ether, ethylene glycol phenyl ether, ethylene glycol monobutyl ether, ethylene glycol ether, B Dibutyl ether; and e). water, and the weight percentage of each component is based on the total weight of the aqueous composition.

The 17$^{th}$ embodiment is a composition comprising:

a). 30% to 80% by weight of at least one acrylic resin selected from the polymer of (meth)acrylic acid, alkyl (meth)acrylate, cycloalkyl (meth)acrylate, alkoxyalkyl (meth)acrylate, (meth)acrylate alkyl ester, hydroxyalkyl (meth)acrylate ester, (meth)acrylonitrile and trifuloroethyl (meth)acrylonitriline and urethane resin that is the reaction product of isocyanates selected from methylene diphenyl diisocyanate (MDI), toluene diisocyanate (TDI), hexamethylene diisocyanate (HDI) and isophorone diisocyanate (IPDI) and polyols selected from the reaction products of carboxylic acids and polyhydroxyl compounds;

b). 0.1% to 10% by weight of at least one epoxysilane selected from glycidyloxypropyltrimethoxysilane, 3-(2,3 epoxypropoxy)propyltrimethoxysilane, 3-(2,3 epoxypropoxy)propyltriethoxysilane, 3-(2,3 epoxypropoxy)propyl Me-thyldiethoxysilane, 2-(3,4-epoxycyclohexane)ethyltrimethoxysilane, 2-(3,4-epoxycyclohexyl)ethyltriethoxysilane, 2-(3,4-epoxycyclohexyl)ethyltrimethoxysilane, 3-(2.3-epoxypropoxy)propylmethyldimethoxysilane and at least one vinylsilane selected from trimethoxyvinylsilane, triethoxyvinylsilane, diethoxymethylvinylsilane, trimethylvinylsilane, 2-pyridyldimethylvinylsilane, triacetoxyvinylsilane, triphenylvinylsilane, trichlorovinylsilane, chloromethylphenylvinylsilane, dichloromethylvinylsilane, triisopropoxyvinylsilane and trimethylstannyldimethylvinylsilane;

c). 0.1% to 3% by weight of at least one fluorosurfactant selected from perfluorooctanesulfonic acid (PFOS), perfluorooctanoic acid (PFOA), and perfluorononanoic acid (PFNA), perfluorobutane sulfonate (PFBS) and perfluorohexanoic acid (PFHxA) and at least one silicone surfactant selected from poly[ethyleneoxide(10)-co-propyleneoxide(2)]-dimethicone,
poly[ethyleneoxide(12)-co-propyleneoxide(16)]-dimethicone,
poly[ethyleneoxide(12)-co-propyleneoxide(18)]-dimethicone,
poly[ethyleneoxide(14)-co-propyleneoxide(4)]-dimethicone,
poly[ethyleneoxide(15)-co-propyleneoxide(15)]-dimethicone,
poly[ethyleneoxide(16)-co-propyleneoxide(2)]-dimethicone,
poly[ethyleneoxide(16)-co-propyleneoxide(8)]-dimethicone,
poly[ethyleneoxide(17)-co-propyleneoxide(18)]-dimethicone,
poly[ethyleneoxide(18)-co-propyleneoxide(18)]-dimethicone,
poly[ethyleneoxide(18)-co-propyleneoxide(6)]-dimethicone,
poly[ethyleneoxide(19)-co-propyleneoxide(19)]-dimethicone,
poly[ethyleneoxide(20)-co-propyleneoxide(15)]-dimethicone,
poly[ethyleneoxide(20)-co-propyleneoxide(20)]-dimethicone,
poly[ethyleneoxide(20)-co-propyleneoxide(23)]-dimethicone,
poly[ethyleneoxide(20)-co-propyleneoxide(29)]-dimethicone,
poly[ethyleneoxide(20)-co-propyleneoxide(6)]-dimethicone,
poly[ethyleneoxide(22)-co-propyleneoxide(23)]-dimethicone,
poly[ethyleneoxide(22)-co-propyleneoxide(24)]-dimethicone,
poly[ethyleneoxide(23)-co-propyleneoxide(6)]-dimethicone,
poly[ethyleneoxide(25)-co-propyleneoxide(25)]-dimethicone,
poly[ethyleneoxide(27)-co-propyleneoxide(27)]-dimethicone,
poly[ethyleneoxide(3)-co-propyleneoxide(10)]-dimethicone,
poly[ethyleneoxide(4)-co-propyleneoxide(12)]-dimethicone,
poly[ethyleneoxide(6)-co-propyleneoxide(11)]-dimethicone,
poly[ethyleneoxide(8)-co-propyleneoxide(14)]-dimethicone,
poly[ethyleneoxide(8)-co-propyleneoxide(26)]-dimethicone,
poly[ethyleneoxide(30)-co-propyleneoxide(10)]-dimethicone,
poly[dimethylsiloxane-co-methyl(3-hydroxypropyl)siloxane]-graft-poly(ethyleneoxide/propyleneoxide);

d) 0.1% to 10% by weight of at least one ether selected from diethylene glycol monobutyl ether, tripropylene glycol monobutyl ether, propylene glycol methyl ether, dipropylene glycol butyl ether, dipropylene glycol methyl ether, diethylene glycol butyl ether, tripropylene glycol butyl ether, ethanol dimethyl ether, ethylene glycol phenyl ether, ethylene glycol monobutyl ether, ethylene glycol ether, B Dibutyl ether and at least one alcohol selected from propylene glycol, butyl alcohol, isopropanol, n-butanol, ethylene glycol, propylene glycol, 1,3-butanediol, dipropylene glycol, diethylaminoethanol; and e). water, and the weight percentage of each component is based on the total weight of the aqueous composition.

The 18$^{th}$ embodiment is a composition of embodiment 1 to 18 that further comprises at least one additive selected from defoamer, crosslinking agent, anti-corrosion agent, silicone and ammonium zirconium carbonate, zirconium acetylacetonate, zirconium acetate.

EXAMPLE

Below examples are used to further illustrate the invention without limitations on the protection scope.

Examples 1 to 9

Add and mix all components according to Table 1 to prepare the anti-rust compositions.

Examples 1 #to 9 #

The anti-rust compositions prepared in Examples 1 to 9 are coated onto a steel substrate and dry the coating layer at 80° C.

The tests include two parts, i.e. before painting and after painting.

Before painting, the coating weight, humidity resistance, alkali resistance, solvent resistance and surface electric resistance tests are carried out on the dried coating layer.

Painting polyester powder onto the dried coating layer to get a second coating layer in a thickness of 70 μm and the anti-corrosion and signal creepage corrosion tests are carried out on the second coating layer. The test results of the samples prepared in Examples 1 to 9 are list in Table 2 as Examples 1 #to 9 #.

Example C1

This is a comparative example that shows test results of steels without anti-rust treatment. And before painting, no degreasing and phosphating steps are carried out.

Example C2

This is another comparative example that shows test results of steels treated with oil (Ferrocoat N 6888-V8 from Quaker) for anti-rust. The coating weight, humidity resistance, alkali resistance, solvent resistance and surface electric resistance tests are carried out on the oil-treated steels.

The oil-treated steels are further treated by removing oil with alkali cleaner, rinsing with water, activated with titanium phosphate and phosphating by Gardobond 24TA (Chemetall). Painting polyester powder onto the treated steels to get a coating layer in a thickness of 70 μm and the anti-corrosion and signal creepage corrosion tests are carried out on the coating layer.

The test results of both Example C1 and C2 are list in Table 2.

Test Standards (1) Humidity Resistance

The standard of humidity resistance test is GB/T 1740-2007, the test time is 480 hours and the test results are divided into four levels:
I: No rust
II: Slight rust, rust area is less than 5% of the total test area
III: Lots of rust, rust area is no less than 5% and less than 50% of the total test area
IV: Serious rust, rust area is no less than 50% of the total test area (2) Solvent Resistance The standard of solvent resistance test is GB/T 23989-2007 and the solvent is ethanol. The test results are divided into four levels:
I: No change, no peeling
II: Slightly whiten, no peeling
III: Seriously whiten, slightly falling
VI: Seriously whiten, seriously falling (3) Alkali Resistance The alkali resistance test is carried out as follows: digging the coated steel plate into a sodium hydroxide solution with a concentration of 2% by weight at 60° C. for 5 minutes and observing the appearance of the coating layer.

The test results are divided into four levels:
I: No change, no falling
II: Slightly whiten, no peeling
III: Seriously whiten, slightly falling
IV: Seriously whiten, seriously falling (4) Surface Electric Resistance The surface electric resistance test is carried out as follows: testing the electric resistance of 10 points on the surface of the coated steel using Loresta MCP T-360 with ESP type and calculate the average number of the electric resistance of the 10 tested point. The test results are divided into four levels:
I: less than 0.1 mΩ
II: no less than 0.1 mΩ and less than 0.5 mΩ
III: no less than 0.5 mΩ and less than 1.0 mΩ
IV: no less than 1.0 mΩ

(5) Anti-Corrosion after Painting

The standard of anti-corrosion test is ASTMB117 and the test time is 500 hours. The painted polyester powder has a thickness of 70 μm. The test results are divided into four levels:
I: No blister
II: Blister area is less than 5% of the total test area
III: Blister area is no less than 5% and less than 20% of the total test area
IV: Blister area is no less than 20% of the total test area (6) Signal Creepage Corrosion after Painting The standard of signal creepage corrosion test is ASTMB117 and the test time is 500 hours and 1000 hours respectively. The painted polyester powder has a thickness of 70 μm. The test results are divided into four levels:
I: After 500 hours the creepage is less than 2 mm and after 1000 hours is still less than 2 mm
II: After 500 hours the creepage is less than 2 mm but after 1000 hours is no less than 2 mm
III: After 500 hours the creepage is no less than 2 mm but after 1000 hours is less than 4 mm
IV: After 500 hours the creepage is no less than 2 mm and after 1000 hours is no less than 4 mm

TABLE 1

| | | Example | | | | | | | | |
|---|---|---|---|---|---|---|---|---|---|---|
| | | 1 | 2 | 3 | 4 | 5 | 6 | 7 | 8 | 9 |
| Component a: | Joncry PRO 1522, BASF | 30 g | 45 g | 65 g | 80 g | / | 80 g | / | 80 g | 45 g |
| | Acure 509, Covestro | / | / | / | / | 80 g | / | 80 g | / | / |
| Component b: | 3-Glycidyloxypropyltrimethoxysilane | 2 g | 3 g | 3 g | 4 g | 4 g | / | / | 4 g | / |
| | Vinyltrimethoxysilane | / | / | / | / | / | 2 g | 2 g | 1 g | 2 g |
| Component c: | BYK 346, byk | 0.1 g | 0.1 g | / | 0.3 g | 0.3 g | / | 0.3 g | 1 g | 0.1 g |
| | Tego wet KL 245, Evonik | / | 0.1 g | 0.2 g | / | / | / | / | / | / |
| | WE 3221, BASF | / | / | / | 0.1 g | 0.1 g | 0.3 g | / | / | / |
| Component d: | Diethylene glycol monobutyl ether | 0.2 g | 0.2 g | 0.3 g | 0.3 g | 0.3 g | 0.3 g | / | / | / |

TABLE 1-continued

| | | Example | | | | | | | | |
|---|---|---|---|---|---|---|---|---|---|---|
| | | 1 | 2 | 3 | 4 | 5 | 6 | 7 | 8 | 9 |
| Additives | Tri-propylene glycol monobutyl ether | 2 g | 3 g | 4 g | 4 g | 4 g | 4 g | 5 g | 5 g | 2.5 g |
| | BYK 028, byk | / | / | / | / | / | / | / | / | 0.1 g |
| | Ammonium zirconium carbonate | 2 g | / | / | / | / | / | / | / | 2 g |
| | Hydroxyethylidene Diphosphonic Acid | 0.3 g | / | / | / | / | / | / | / | / |
| | Phosphate acid | / | / | / | / | / | / | / | / | 0.1 g |
| Water | | residual | residual | residual | residual | residual | residual | residual | residual | residual |
| Total | | 100 g | 100 g | 100 g | 100 g | 100 g | 100 g | 100 g | 100 g | 100 g |

TABLE 2

| | | Before painting | | | | After painting | |
|---|---|---|---|---|---|---|---|
| Example | Coating weight (g/m2) | Humidity resistance | Alkali resistance | Solvent resistance | Surface electric resistance | Anti-corrosion 500 h | Signal creepage after 500 h/1000 h |
| 1# | 0.2 | II | I | I | I | I | III |
| 2# | 0.4 | I | I | I | II | I | II |
| 3# | 0.6 | I | I | I | III | I | II |
| 4# | 0.8 | I | I | I | III | I | II |
| 5# | 0.8 | I | I | I | III | I | II |
| 6# | 0.8 | I | I | I | III | I | III |
| 7# | 0.8 | I | I | I | III | I | II |
| 8# | 0.8 | I | I | I | III | I | I |
| 9# | 0.8 | I | I | I | II | I | I |
| C1 | / | IV | N.A. | N.A. | I | IV | IV |
| C2 | / | I | dissolved | dissolved | I | IV | IV |

N.A. = not applicable

The invention claimed is:

1. An anti-rust composition for metal surfaces consisting of:
   a) 30% to 80% by weight of water-soluble or water-dispersible acrylic resin selected from the group consisting of polymerized hydroxyalkyl (meth)acrylate ester;
   b) 0.1% to 10% by weight of epoxysilane and/or vinylsilane;
   c) 0.1% to 3% by weight of silicone surfactant and/or fluorosurfactant;
   d) 0.1% to 10% by weight of alcohol and/or ether; and
   e) water, and
   optionally at least one additive selected from the group consisting of defoamer, crosslinking agent, anti-corrosion agent, silicone and ammonium zirconium carbonate, zirconium acetylacetonate, and zirconium acetate;
   wherein the weight percentage of each component is based on the total weight of the aqueous composition.

2. The anti-rust composition according to claim 1, wherein said epoxysilane in component b) is at least one selected from the group consisting of glycidyloxypropyltrimethoxysilane, 3-(2,3-epoxypropoxy) propyltrimethoxysilane, 3-(2,3-epoxypropoxy) propyltriethoxysilane, 3-(2,3-epoxypropoxy)propylmethyldiethoxysilane 2-(3,4-epoxycyclohexane) ethyltrimethoxysilane, 2-(3,4-epoxycyclohexyl) ethyltriethoxysilane, 2-(3,4-epoxy cyclohexyl) ethyldimethoxysilane, and 3-(2,3-epoxypropoxy) propylmethyldimethoxysilane.

3. The anti-rust composition according to claim 1, wherein said vinylsilane in component b) is at least one selected from the group consisting of trimethoxyvinylsilane, triethoxyvinylsilane, diethoxymethylvinylsilane, trimethylvinylsilane, 2-pyridyldimethylvinylsilane, triacetoxyvinylsilane, triphenylvinylsilane, trichlorovinylsilane, chloromethylphenylvinylsilane, dichloromethylvinylsilane, triisopropoxylvinylsilane and trimethylstannyldimethylvinylsilane.

4. The anti-rust composition according to claim 1, wherein said silicone surfactant in component c) is at least one selected from the group consisting of non-ionic organopolysiloxane, cationic organopolysiloxane and anionic organopolysiloxane.

5. The anti-rust composition according to claim 1, wherein said fluorosurfactant in component c) is at least one selected from the group consisting of perfluorooctanesulfonic acid (PFOS), perfluorooctanoic acid (PFOA), and perfluorononanoic acid (PFNA), perfluorobutane sulfonate (PFBS) and perfluorohexanoic acid (PFHxA).

6. The anti-rust composition according to claim 1, wherein said alcohol in component d) is at least one selected from the group consisting of propylene glycol, butyl alcohol, isopropanol, n-butanol, ethylene glycol, propylene glycol, 1,3-butanediol, dipropylene glycol, and diethylaminoethanol.

7. The anti-rust composition according to claim 1, wherein said ether in component d) is at least one selected from the group consisting of diethylene glycol monobutyl ether, tripropylene glycol monobutyl ether, propylene glycol methyl ether, dipropylene glycol butyl ether, dipropylene glycol methyl ether, ether, ethanol dimethyl ether, ethylene glycol phenyl ether, ethylene glycol monobutyl ether, ethylene glycol ether, and dibutyl ether.

8. The anti-rust composition according to claim 1, wherein said silicone surfactant in component c) is at least one selected from the group consisting of poly[ethyleneoxide(10)-co-propyleneoxide(2)]-dimethicone, poly[ethyleneoxide(12)-co-propyleneoxide(16)]-dimethicone,
poly[ethyleneoxide(12)-co-propyleneoxide(18)]-dimethicone,
poly[ethyleneoxide(14)-co-propyleneoxide(4)]-dimethicone,
poly[ethyleneoxide(15)-co-propyleneoxide(15)]-dimethicone,
poly[ethyleneoxide(16)-co-propyleneoxide(2)]-dimethicone,
poly[ethyleneoxide(16)-co-propyleneoxide(8)]-dimethicone,
poly[ethyleneoxide(17)-co-propyleneoxide(18)]-dimethicone,
poly[ethyleneoxide(18)-co-propyleneoxide(18)]-dimethicone,
poly[ethyleneoxide(18)-co-propyleneoxide(6)]-dimethicone,
poly[ethyleneoxide(19)-co-propyleneoxide(19)]-dimethicone,
poly[ethyleneoxide(20)-co-propyleneoxide(15)]-dimethicone,
poly[ethyleneoxide(20)-co-propyleneoxide(20)]-dimethicone,
poly[ethyleneoxide(20)-co-propyleneoxide(23)]-dimethicone,
poly[ethyleneoxide(20)-co-propyleneoxide(29)]-dimethicone,
poly[ethyleneoxide(20)-co-propyleneoxide(6)]-dimethicone,
poly[ethyleneoxide(22)-co-propyleneoxide(23)]-dimethicone,
poly[ethyleneoxide(22)-co-propyleneoxide(24)]-dimethicone,
poly[ethyleneoxide(23)-co-propyleneoxide(6)]-dimethicone,
poly[ethyleneoxide(25)-co-propyleneoxide(25)]-dimethicone,
poly[ethyleneoxide(27)-co-propyleneoxide(27)]-dimethicone,
poly[ethyleneoxide(3)-co-propyleneoxide(10)]-dimethicone, poly[ethyleneoxide(4)-co-propyleneoxide(12)]-dimethicone, poly[ethyleneoxide(6)-co-propyleneoxide(11)]-dimethicone, poly[ethyleneoxide(8)-co-propyleneoxide(14)]-dimethicone, poly[ethyleneoxide(8)-co-propyleneoxide(26)]-dimethicone, poly[ethyleneoxide(30)-co-propyleneoxide(10)]-dimethicone, and poly[dimethylsiloxane-co-methyl(3-hydroxypropyl)siloxane]-graft-poly(ethyleneoxide/propyleneoxide).

9. An anti-rust treatment method on a metal surface comprising steps of
  i. coating the anti-rust composition according to claim 1 onto the metal surface; and
  ii. drying the coating layer at a temperature from 60° C. to 150° C.

10. The anti-rust treatment method on a metal surface according to claim 9, wherein said metal surface is selected from the group consisting of the surfaces of cold roll steel, hot dip galvanized steel and electrogalvanized steel.

11. The anti-rust treatment method on a metal surface according to claim 9, wherein said coating layer dried after step ii has a thickness of from 100 nm to 1000 nm.

12. An anti-rust treated coil steel obtained by the method according to claim 9.

13. The anti-rust treated coil steel according to claim 12, wherein its surfaces have an electric resistance of less than 1 mΩ.

14. A surface treatment method comprising the anti-rust treatment method according to claim 9.

15. The surface treatment method according to claim 9, further comprising a step of painting.

16. The surface treatment method according to claim 14, wherein it does not comprise steps of degreasing and phosphating.

\* \* \* \* \*